United States Patent
Bloodworth et al.

(10) Patent No.: US 6,751,034 B1
(45) Date of Patent: Jun. 15, 2004

(54) PREAMPLIFIER READ RECOVERY PARADE

(75) Inventors: Bryan E. Bloodworth, Irving, TX (US); Ashish Manjrekar, Dallas, TX (US); Echere Iroaga, Garland, TX (US)

(73) Assignee: Texas Instruments Incorporated, Dallas, TX (US)

( * ) Notice: Subject to any disclaimer, the term of this patent is extended or adjusted under 35 U.S.C. 154(b) by 490 days.

(21) Appl. No.: 09/618,684

(22) Filed: Jul. 19, 2000

(51) Int. Cl.$^7$ .................................................. G11B 5/09

(52) U.S. Cl. ............................. 360/46; 360/51; 360/53

(58) Field of Search ....................................... 360/1–80

(56) References Cited

U.S. PATENT DOCUMENTS

| | | | | |
|---|---|---|---|---|
| 4,956,720 A | * | 9/1990 | Tomisawa | 386/21 |
| 5,060,087 A | * | 10/1991 | Nishijima et al. | 386/53 |
| 5,724,201 A | * | 3/1998 | Jaffard et al. | 360/62 |
| 5,726,821 A | * | 3/1998 | Cloke et al. | 360/67 |
| 5,917,670 A | | 6/1999 | Scaramuzzo et al. | |
| 5,982,569 A | | 11/1999 | Lin et al. | |
| 5,995,311 A | | 11/1999 | Kuwano | |
| 6,061,192 A | | 5/2000 | Ogiwara | |
| 6,147,824 A | * | 11/2000 | Shibasaki et al. | 360/46 |
| 6,292,444 B1 | * | 9/2001 | Ikeda et al. | 369/44.29 |
| 6,404,578 B1 | * | 6/2002 | Bhandari et al. | 360/61 |
| 2002/0075584 A1 | * | 6/2002 | Patti et al. | 360/25 |

FOREIGN PATENT DOCUMENTS

JP 54126522 A * 10/1979 ............ G11B/5/09

OTHER PUBLICATIONS

"A Design for High Noise Rejection in a Pseudodifferential Preamplifier for Hard Disk Drives", IEEE Journal of Solid–State Circuits, Vo. 35, No. 6, Jun., 2000, 2 pp.

"Fast Offset Recovery for Thermal Asperity Data Recovery Procedure", IBM Technical Disclosure Bulletin, Apr., 1992, Publication No. 11, Reprinted from the Internet at: http://www.patents.ibm.com/tdbs/tdb?o=92A%2061003, 2 pp.

* cited by examiner

Primary Examiner—David Hudspeth
Assistant Examiner—Glenda P Rodriguez
(74) Attorney, Agent, or Firm—W. Daniel Swayze, Jr.; W. James Brady; Frederick J. Telecky, Jr.

(57) ABSTRACT

The present invention relates to a method of enhancing a preamplifier read recovery in a hard disk drive system and comprises the steps of determining whether the hard disk drive system is transitioning from a non-read state to a read state and initiating a non-read state to a read state transition sequence when a transition from the non-read state to the read state is determined. The transition sequence is independent of a type of non-read state prior to the transitioning. After the non-read state to read state transition sequence is complete the read mode is initiated. In addition, the invention comprises a system for controlling a transition from a non-read state to a read state associated with a preamplifier in a hard disk drive system. The system comprises a detection circuit operable to detect a completion of the non-read state and a non-read state to read state circuit operable to execute a series of events to transition from the non-read state to the read state, wherein the series of events is the same regardless of a type of non-read state. Further, the system comprises a read state initiation circuit operable to initiate the read state after the execution of the series of events.

14 Claims, 7 Drawing Sheets

PREAMPLIFIER READ RECOVERY PARADE

FIELD OF THE INVENTION

The present invention relates in general to the field of mass storage devices, and more particularly to a system and method for enhancing a preamplifier read recovery when the mass storage device transitions from a non-read state to a read state.

BACKGROUND OF THE INVENTION

Figure 1:
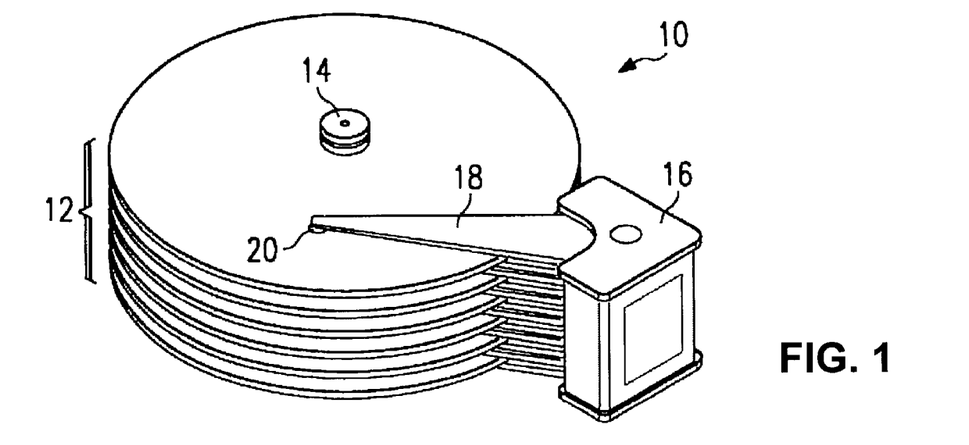
FIG. 1 is a perspective view of a prior art disk drive mass storage system.

Hard disk-drives such as the exemplary drive 10 illustrated in FIG. 1 include a stack of magnetically coated platters 12 that are used for storing information. The magnetically coated platters 12 are mounted together in a stacked position through a spindle 14 which may be referred to as a platter stack. The platter stack is typically rotated by a motor that is referred to as a spindle motor or a servo motor (not shown). A space is provided between each platter to allow an arm 18 having a read/write head or slider 20 associated therewith to be positioned on each side of each platter 12 so that information may be stored and retrieved. Information is stored on each side of each platter and is generally organized into sectors, tracks, zones, and cylinders.

Each of the read/write heads or sliders 20 are mounted to one end of the dedicated suspension arm 18 so that each of the read/write heads may be positioned as desired. The opposite end of each of the suspension arms 18 are coupled together at a voice coil motor 16 (VCM) to form one unit or assembly (often referred to as a head stack assembly) that is positionable by the voice coil motor. Each of the suspension arms 18 are provided in a fixed position relative to each other. The voice coil motor 16 positions all the suspension arms 18 so that the active read/write head 20 is properly positioned for reading or writing information. The read/write heads 20 may move from at least an inner diameter to an outer diameter of each platter 12 where data is stored. This distance may be referred to as a data stroke. Hard disk drives also include a variety of electronic circuitry for processing data and for controlling its overall operation. This electronic circuitry may include a pre-amplifier, a read channel, a write channel, a servo controller, a motor control circuit, a read-only memory (ROM), a random-access memory (RAM), and a variety of disk control circuitry (not shown) to control the operation of the hard disk drive and to properly interface the hard disk drive to a system bus. The pre-amplifier may contain a read pre-amplifier and a write pre-amplifier that is also referred to as a write driver. The pre-amplifier may be implemented in a single integrated circuit or in separate integrated circuits such as a read pre-amplifier and a write pre-amplifier or write driver. The disk control circuitry generally includes a separate microprocessor for executing instructions stored in memory to control the operation and interface of the hard disk drive.

Hard disk drives perform write, read, and servo operations when storing and retrieving data. Generally, a write operation includes receiving data from a system bus and storing the data in the RAM. The microprocessor schedules a series of events to allow the information to be transferred from the RAM to the platters 12 through the write channel. Before the information is transferred, the read/write heads 20 are positioned on the appropriate track and the appropriate sector of the track is located. The data from the RAM is then communicated to the write channel as a digital write signal. The write channel processes the digital write signal and generates an analog write signal. In doing this, the write channel may encode the data so that the data can be more reliably retrieved later. The digital write signal may then be provided to an appropriate read/write head 20 after first being conditioned by the pre-amplifier. Writing data to the recording medium or platter 12 is typically performed by applying a current to a coil of the head 20 so that a magnetic field is induced in an adjacent magnetically permeable core, with the core transmitting a magnetic signal across a spacing of the disk to magnetize a small pattern or digital bit of the media associated with the disk.

Figure 2:
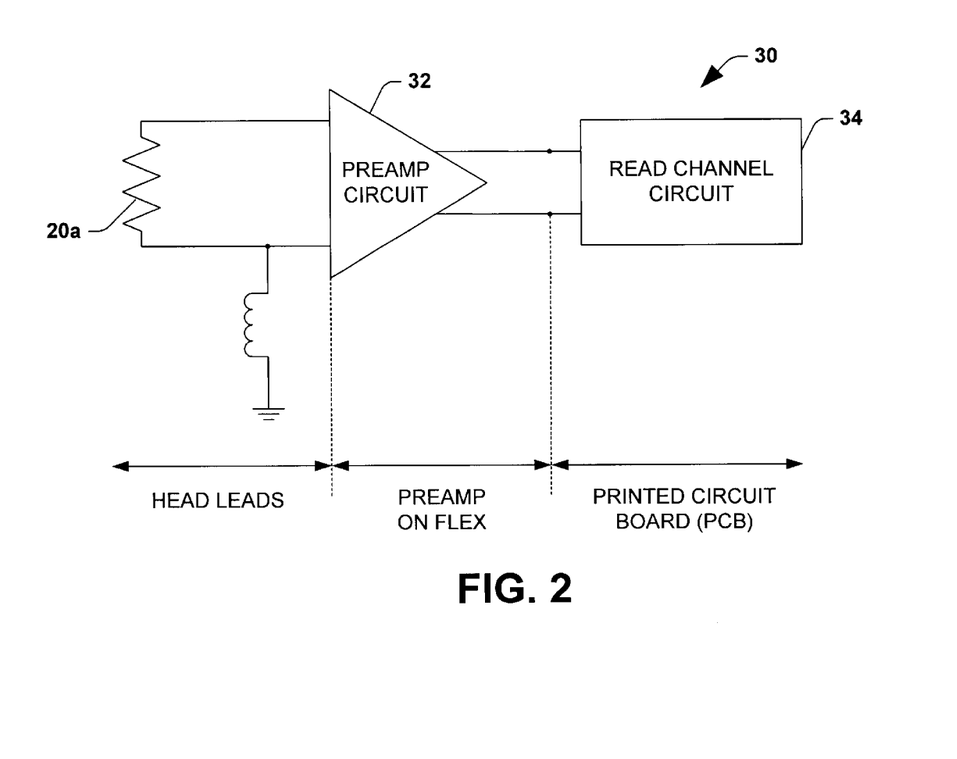
FIG. 2 is a schematic diagram illustrating circuitry associated with read/write operations in a disk drive mass storage system.

Circuitry associated with a read operation is illustrated in FIG. 2, and designated at reference numeral 30. In a read operation, the appropriate sector to be read is located and data that has been previously written to the platters 12 is read. The appropriate read/write head 20 (illustrated as a magneto-resistive load 20a in FIG. 2) senses the changes in the magnetic flux and generates a corresponding analog read signal. The analog read signal is provided back to the electronic circuitry where a preamplifier circuit 32 amplifies the analog read signal. The amplified analog read signal is then provided to a read channel circuit 34 where the read channel conditions the signal and detects "zeros" and "ones" from the signal to generate a digital read signal. The read channel may condition the signal by amplifying the signal to an appropriate level using, for example, automatic gain control (AGC) techniques. The read channel may then filter the signal to eliminate unwanted high frequency noise, equalize the channel, perform the data recovery from the signal, and format the digital read signal. The digital read signal is then transferred from the read channel and is stored in the RAM (not shown). The microprocessor may then communicate to the host that data is ready to be transferred.

The read channel circuit 34 may be implemented using any of a variety of known or available read channels. For example, the read channel 34 may be implemented as a peak detection type read channel or as a more advanced type of read channel utilizing discrete time signal processing. The peak detection type read channel involves level detecting the amplified analog read signal and determining if the waveform level is above a threshold level during a sampling window. The discrete time signal processing type read channel synchronously samples the amplified analog read signal using a data recovery clock. The sample is then processed through a series of mathematical manipulations using signal processing theory to generate the digital read signal. There are several types of discrete time signal processing read channels such as a partial response, maximum likelihood (PRML) channel; an extended PRML channel; an enhanced, extended PRML channel; a fixed delay tree search channel; and a decision feedback equalization channel.

Figure 3:
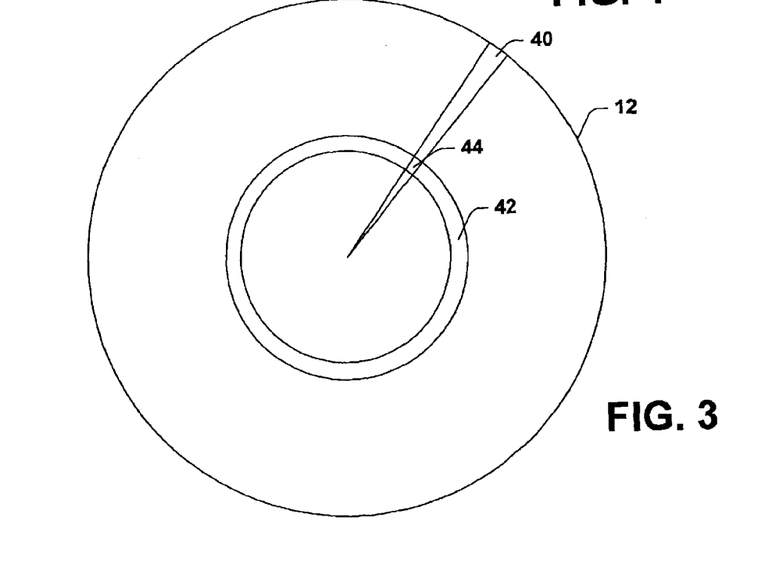
FIG. 3 is a plan view illustrating a platter having a servo wedge associated therewith for use in positioning a read/write head accurately thereon.

As the disk platters 12 are rotating, the read/write heads 20 must align or remain on a particular track. This is accomplished by a servo operation through the use of a servo controller provided in a servo control loop. Referring to FIG. 3 which represents a plan view of an exemplary platter 12, in a servo operation a servo wedge 40 is read from a track 42 that generally includes track identification information and track misregistration information 44. The track misregistration information may also be referred to as position error information. The position error information 44 may be provided as servo bursts and may be used during both read and write operations to ensure that the read/write heads are properly aligned on a track. As a result of receiving the position error information, the servo controller generates a corresponding control signal to position the read/write heads 20 via the voice coil motor. The track identification information 44 from the servo wedge 40 is also used during read and write operations so that a track 42 may be properly identified.

Hard disk drive designers strive to provide higher capacity drives that operate at a high signal-to-noise ratio and a low bit error rate. To achieve higher capacities, the density of the data stored on each side of each platter must be increased. This places significant burdens on the hard disk drive electronic circuitry. For example, as the density increases, the magnetic transitions that are used to store data on the platters must be physically located more closely together. This often results in intersymbol interference when performing a read operation. As a result, the hard disk drive electronic circuitry must provide more sophisticated processing circuitry that operates at higher frequencies to accurately process the intersymbol interference and the higher frequency read signal. In some cases, the spindle motor speed is increased which further increases the frequency of the read signal and the write signal. Furthermore, the increase in density requires that the servo control system be provided with a higher bandwidth to increase the read/write head positioning resolution.

As discussed above, to account for the increased data storage density, the spindle motor speed is being increased from a platter rotational speed of about 5400 RPMs to about 7200 RPMs or greater. To account for the increased speed, the write-to-read transition timing for a head 20 becomes important. For example, when performing a write operation, the head 20 is traversing a track 42 on the platter 12 as the platter spins there beneath. As illustrated in FIG. 3, when a servo region or wedge 40 is encountered, the head 20 must quickly transition from a write state to a read state in order to read the servo information stored therein and then quickly transition back to a write state in order to continue writing the data to the platter 12. If the write-to-read transition timing is slow, then the servo wedge 40 must be larger since the platter is rotating at a generally constant speed. Since many servo wedges 40 exist on the platter 12 (e.g., about 60) an optimized write-to-read transition timing allows for the wedges 40 to be minimized, thereby increasing data storage density thereon.

In addition to the write-to-read transition timing being an important transition sequence, the increase in rotational speed of the platter has caused various other transition sequences that have heretofore been relatively unimportant (that is, designers did not give such sequencing a substantial amount of attention) to become a matter of greater design consideration. Such transition sequences involve a transition from a non-read state to a read state (often called a read recovery) and include, for example: an idle-to-read transition state, the bias current change-to-read state, the head change-to-read state, head change and bias current change-to-read state, and the bias current OFF/ON-to-read state. There is a need in the art to provide optimized state transition sequencing for high rotation platter speeds to provide high data storage density.

SUMMARY OF THE INVENTION

The present invention relates to a system and method of enhancing a read recovery of a hard disk drive preamplifier circuit when the system transitions from a non-read state to a read state. The invention improves the transition switching performance from a non-read state to a read state, saves chip area and reduces circuit complexity by providing a common sequencing for different state transitions to a read state.

According to one aspect of the present invention, a common transition switching methodology is employed whenever the disk drive transitions from a non-read state to a read state. The common transition switching methodology allows the same circuitry to be reused for each transition to a read state, thereby simplifying the control circuitry and saving die area which reduces cost. In the transition from a non-read state to a read state, a wait period is initiated once the unique non-read sequence is complete which advantageously minimizes noise or other adverse effects associated with the inductance associated with the preamplifier and the read channel.

After the predetermined wait period has expired, a pole associated with an AC coupler circuit between the preamplifier and the read channel circuit is shifted from a first, higher frequency to a second, lower frequency at a gradual predetermined rate, thus altering the band pass response of the AC coupler between non-read states and the read state. The gradual shifting of the pole slowly alters the phase of the preamplifier output signal as opposed to a generally instantaneous or fast shifting, thus avoiding read channel errors caused by the sampling of noise to the read channel circuit. After another predetermined period of time has passed in which the pole is gradually shifted, a squelch signal is de-asserted or otherwise transitions which removes a squelch condition such as a "short circuit" condition across the preamplifier output so that the read function may be effectuated. Having the squelch condition activated during a non-read state prevents spurious noise from negatively impacting the signal processing circuitry.

To the accomplishment of the foregoing and related ends, the invention comprises the features hereinafter fully described and particularly pointed out in the claims. The following description and the annexed drawings set forth in detail certain illustrative aspects and implementations of the invention. These are indicative, however, of but a few of the various ways in which the principles of the invention may be employed. Other objects, advantages and novel features of the invention will become apparent from the following detailed description of the invention when considered in conjunction with the drawings.

DETAILED DESCRIPTION OF THE INVENTION

The present invention will now be described with respect to the accompanying drawings in which like numbered elements represent like parts. The present invention is directed to a system and method of facilitating a quick and efficient transition from a non-read state to a read state in a disk drive mass storage system. The present invention effectuates the above functionality by employing a single common state transition sequence for transitions from a non-read state to a read state, thus minimizing the complexity and cost associated with customized state transition sequencing routines for each unique transition. The single common state transition sequence provides an optimized sequence that takes the preamplifier circuit from a non-read state to a read state in a smooth manner.

In accordance with one aspect of the present invention, during any non-read state (e.g., write, idle, head change, etc.) the preamplifier output is put into a squelched state (e.g., shorting the preamplifier output) to avoid spurious noise, etc. In addition, a pole associated with the high-pass AC coupling circuit of the preamplifier is shifted up in frequency to further prevent noise from coupling to the read channel circuit during the non-read state. Whenever one of the non-read states is completed and a transition to the read state is desired, the preamplifier circuit follows a predetermined sequence. The predetermined sequence includes, for example, a predetermined wait period to allow for voltage transient settling due to system inductance. After the predetermined wait period, the pole associated with the high-pass AC coupling circuit is shifted down in frequency in a slow, deliberate fashion to avoid noise from being transferred to the read channel. Subsequently, the squelch signal transitions to signal the end of the non-read state and the initiation of the read state.

Figure 5:
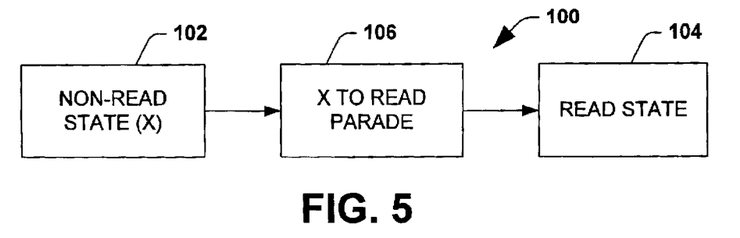
FIG. 5 is a block diagram illustrating a read recovery sequence for transitioning a disk drive mass storage system from a non-read state to a read state in accordance with the present invention.

Turning now to the figures, FIG. 5 is a block level diagram which highlights a state transition sequence according to the present invention, and is designated at reference numeral 100. The sequence 100 provides for a dedicated, uniform transition from any non-read state (X) 102 to a read state 104 via a non-read to read parade sequence 106 (an X-to-read parade). The parade sequence 106 is the same for various non-read to read state transitions, and preferably is the same for all non-read to read state transitions, thus avoiding the cost and complexity of multiple, unique switching routines for each unique non-read to read state transition.

Figure 6:
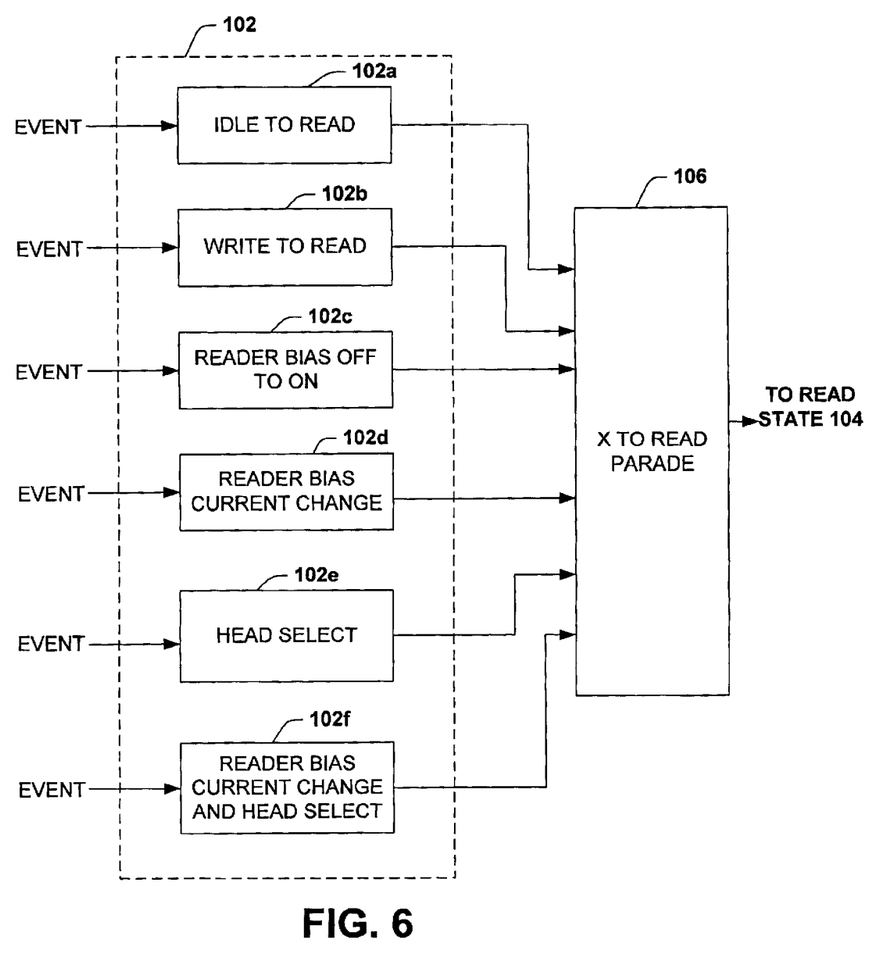
FIG. 6 is a block diagram illustrating in greater detail a read recovery sequence for transitioning from one of multiple non-read states to a read state through a predetermined sequence in accordance with the present invention.

FIG. 6 is a block diagram illustrating a plurality of different non-read states 102 and illustrates how each non-read state transitions to the read state 104 through the same X-to-read parade sequence 106. For example, if a previous event involved the read/write head at issue being in an idle state, the preamplifier circuit will transition from the idle state to the read state via path 102a. For such a transition, the initiation of such a state transition at step 102a will initiate the X-to-read parade 106. Similarly, if a previous event involved the read/write head at issue being in the write state, the preamplifier circuit will need to transition from the write state to the read state via path 102b, which initiates a state transition via the X-to-read parade 106. Likewise, other previous events, for example, events 102c–102f will also transition to the read mode state 104 through the same X-to-read parade transition sequence 106.

Figure 7:
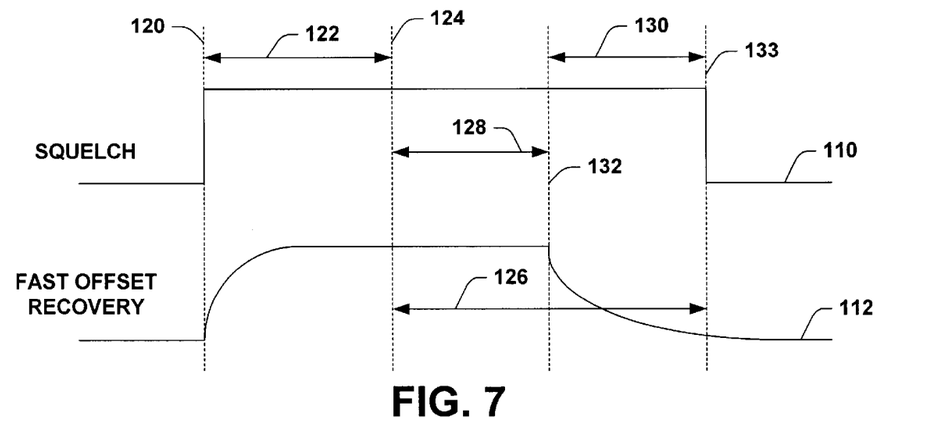
FIG. 7 is a series of waveform diagrams illustrating timing signals associated with a read recovery sequence for transitioning from a non-read state to a read state in a predetermined fashion in accordance with the present invention.

According to one exemplary aspect of the present invention, the X-to-read parade 106 is illustrated in the timing diagrams of FIG. 7, representing a squelch signal 110 and a fast offset recovery signal 112, respectively. The squelch signal 110 is utilized, for example, to selectively short the output of the preamplifier circuit associated with an "unselected head", that is, a head that has not been selected for a read operation. By shorting the preamplifier output under such conditions, any potential noise from the unselected head is prevented from coupling to the read channel circuitry. The fast offset recovery signal 112 reflects the movement of a pole associated with a high-pass AC coupler circuit associated with the output of the preamplifier circuit which is fed to the read channel circuit.

At an instant 120 the squelch signal 110 is asserted (e.g., transitions from low to high), thus shorting the preamplifier output associated with the head which is in a non-read state and signaling an end of a read mode for the given head. During a time interval 122 a unique sequence of events may occur depending on which non-read state exists, for example, a write operation, an idle state, a head switch, etc. In addition, at the instant 120 the fast offset recovery signal 112 also transitions from low to high to alter the band pass response of the AC coupler circuit when in the non-read state.

At an instant 124, the time interval 122 ends, thus representing a termination of the unique sequence (the non-read state (X)). At this instant 124 an X-to-read parade time interval 126 is initiated. According to one aspect of the present invention, the parade time interval 126 is programmable, for example, using a two bit user-selectable value, wherein the time interval may vary between about 100 nS and about 400 nS in 100 nS intervals (e.g., 100 nS, 200 nS, 300 nS and 400 nS). The parade time interval 126 may take on different values based on various user performance constraints. For example, if a fast read recovery is desired, a 100 nS time interval may be selected. Alternatively, if more time is desired due to system inductance (as will be discussed in greater detail infra) or other factors, a longer time interval may be selected. In any event, the parade time interval 126 comprises two time subintervals 128 and 130 in which the parade sequence 106 passes sequentially through two states beginning at a time instant 132 and ending at a time instant 133 in which the squelch signal 110 again transitions (e.g., eliminating the short at the output of the preamplifier), indicating the end of the non-read state and the initiation of a read state.

Figure 4:
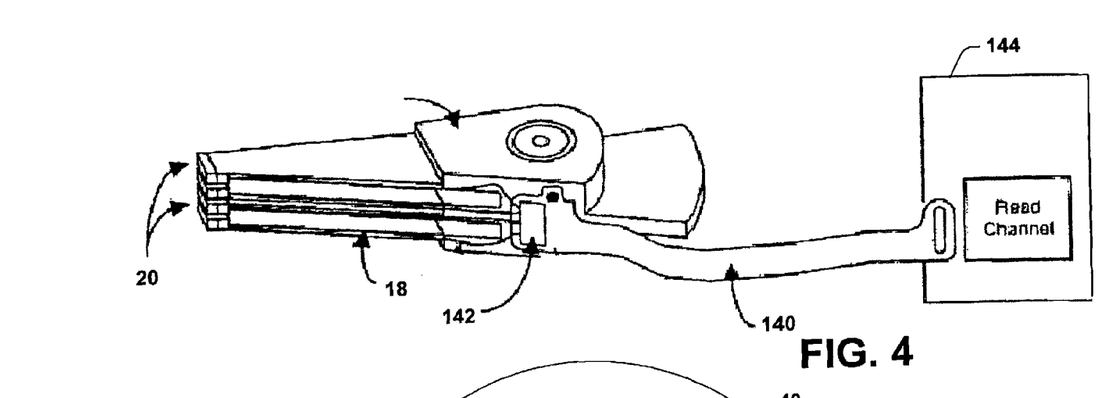
FIG. 4 is a perspective view of a portion of a disk drive system illustrating an inductance associated with the flex which couples a read channel integrated circuit to a preamplifier integrated circuit in a disk drive mass storage system.

In a first parade time subinterval 128 a wait time is initiated for a predetermined time period. The wait time subinterval 128 is implemented, for example, to let transient voltages associated with the preamplifier circuit to settle due to the power supply inductance and the inductance of a flex 140 used to couple the preamplifier circuit 142 to the read channel circuit 144, as illustrated in FIG. 4. Therefore the flex inductance is associated with the line inductance between the preamplifier 142 and the read channel 144.

The wait time subinterval period 128 may vary based on the selected parade time interval 126 and the subsequent pole shift subinterval 130. Preferably the pole shift subinterval 130 is 50 nS or more to enable the pole to be shifted slowly. Therefore if the pole shift subinterval 130 is selected to be 100 nS and the total parade time is selected to be 200 nS, the wait time subinterval 128 will be 100 nS. The wait time subinterval 128 may be implemented by a delay circuit such as a programmable counter, a timer, or a capacitor sized appropriately for the desired delay, however, any type of delay circuit may be employed and is contemplated as falling within the scope of the present invention.

Once the wait time subinterval 128 has completed at the time instant 132, the pole shift subinterval 130 is initiated in which the pole associated with the high-pass AC coupler circuit of the preamplifier is shifted from a first, higher frequency to a second, lower frequency. Such a shift is illustrated diagrammatically in FIGS. 8a and 8b, respectively. The AC coupler circuit typically is associated with the preamplifier and exhibits a band pass response which acts to reject DC and low frequency signals from coupling to the read channel circuitry and thus serves as a nulling circuit to null any offsets. In a non-read mode or state represented by the time interval 122 of FIG. 7, the pole associated with the AC coupler circuit is increased to a relatively high frequency (e.g., about 10 MHz) to ensure that all low frequency "garbage" is rejected and not passed to the read channel circuit, thus improving noise rejection in the non-read state.

Once the non-read state is concluded, the parade sequence 106 includes the shifting of the pole associated with the AC coupler circuit back to the second, lower frequency (e.g., about 1 MHz) during the time subinterval 130. In particular, the shifting of the pole does not occur instantaneously, but instead is performed in a generally slow, deliberate manner, for example, over a time period of about 50 nS or more. According to one aspect of the present invention, moving the pole impacts the transfer function of the AC coupler circuit, thus changing the phase of an output signal associated therewith. If the pole is shifted generally simultaneously or quickly, any noise present at that instant may get sampled and transferred to the read channel which is undesirable. By shifting the pole in a relatively slow, deliberate manner the phase information of an output signal is not disturbed and noise is prevented from being transferred to the read channel more effectively.

Figure 8A:
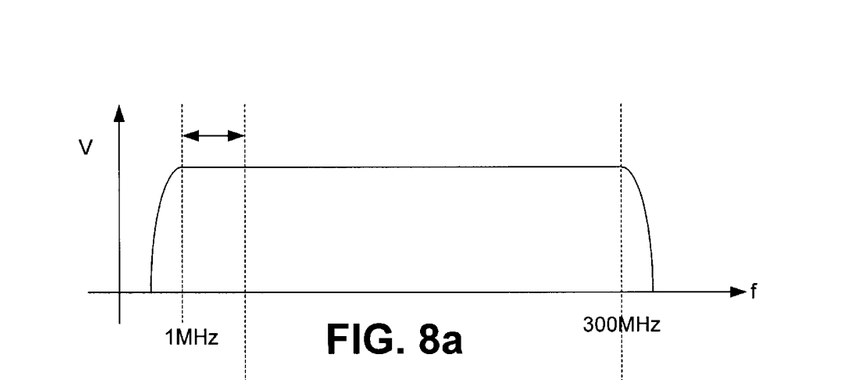
FIGS. 8a and 8b are a series of waveform diagrams illustrating a shifting of a pole associated with an offset AC circuit between a first and second frequency utilized in transitioning from a non-read state to a read state in accordance with the present invention.
Figure 8B:
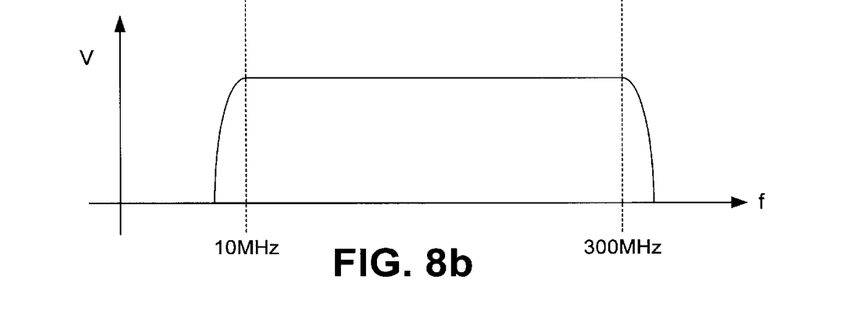

FIG. 8a illustrates an exemplary band pass response for the combination of the AC coupler circuit and preamplifier in a read state, wherein signals having frequencies outside the band of about 1 MHz–300 MHz are rejected. Similarly, FIG. 8b represents the bandpass response for the AC coupler circuit and preamplifier in a non-read state in accordance with one exemplary aspect of the present invention, wherein signals outside the band (e.g., about 10 MHz–300 MHz) are rejected. Note that the low frequency rejection (a function of the pole which is shifted in accordance with the present invention) has moved to a higher frequency, which results in a larger range of signal frequencies being rejected which is advantageous in the non-read state. When the preamplifier transitions from a non-read state to a read state, the pole is shifted so as to lower the bottom cutoff frequency. Consequently, in the read state low frequency data and servo information may be read effectively. Further, such low frequency functionality in the read state facilitates circuit and system test.

Figure 9A:
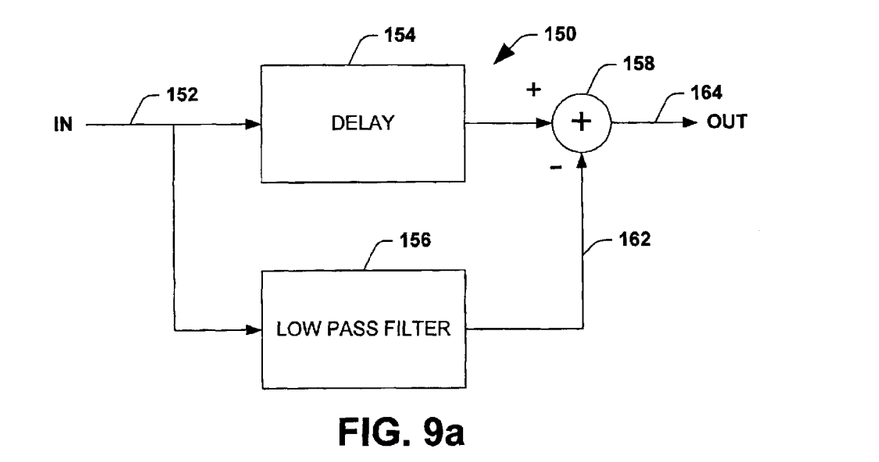
FIG. 9a is a block diagram illustrating a circuit for shifting a pole associated with an offset AC circuit between a first and second frequency in accordance with the present invention.

One exemplary circuit for shifting the pole of the AC coupler circuit is illustrated in FIG. 9a and designated at reference numeral 150. The circuit 150 includes an input 152 in which the output of the AC coupler circuit is fed into a delay block 154 and a low pass filter circuit 156. The delay block 154 is advantageously employed to synchronize the subsequent subtraction of the input 154 from a filtered version of the input at the decision block 158. The low pass filter 156 is operable to pass signals having a frequency below a cutoff frequency, the cutoff frequency $f_{LPF}$ being a function of the desired pole.

Figure 9B:
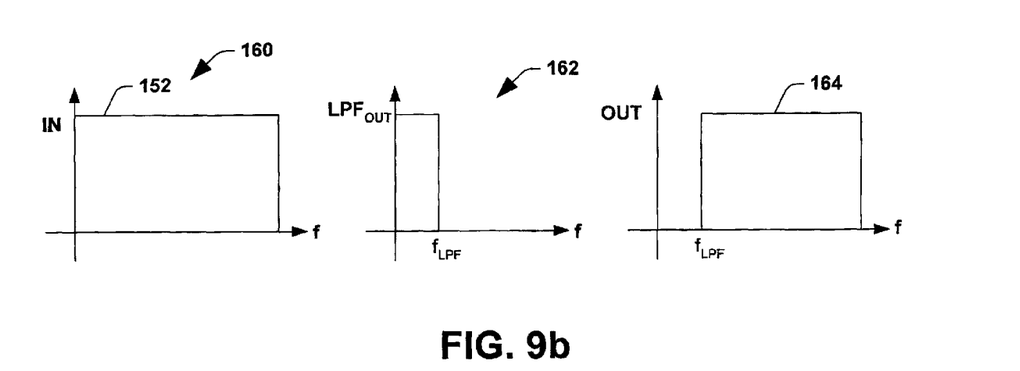
FIG. 9b is a series of waveform diagrams illustrating an exemplary manner of shifting a poly associated with an offset AC circuit between a first and second frequency in accordance with the present invention.

As illustrated in FIG. 9b, a first graph 160 represents a frequency range associated with the input signal 152 and a second graph represents a frequency range 162 associated with the output of the low pass filter 156. By subtracting the low pass response of range 162 from that of range 152, a band pass response 164 is provided at the output of FIG. 9a, as illustrated in FIG. 9b, wherein the low frequency cutoff $f_{LPF}$ is a function of the cutoff frequency of the low pass filter. Therefore by varying the cutoff frequency of the low pass filter 156, the pole of the AC coupler circuit may be moved from a first, higher frequency to a second, lower frequency when the preamplifier is transitioning from a non-read state (X) to the read state.

Figure 10:
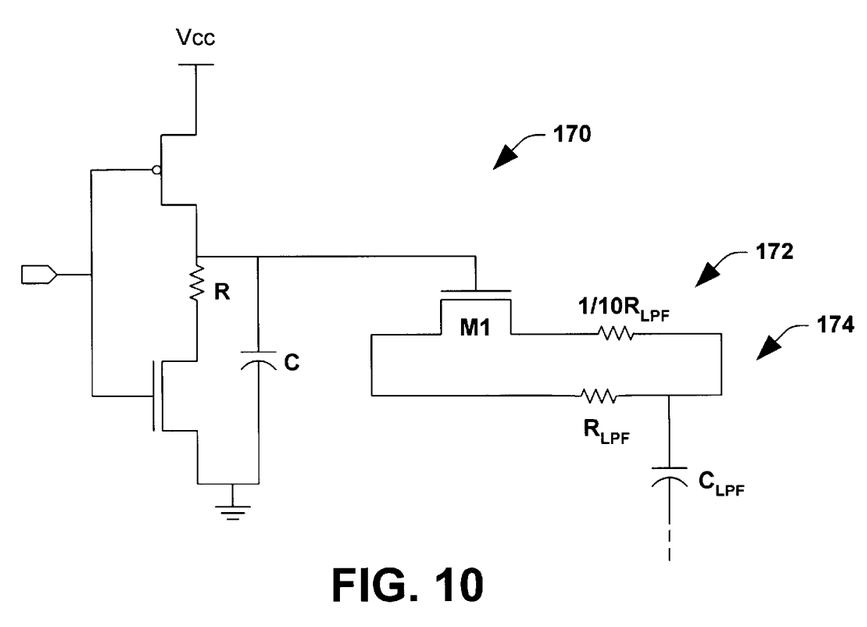
FIG. 10 is a schematic diagram illustrating in greater detail a circuit for shifting a poly associated with an offset AC circuit between a first and a second frequency in accordance with the present invention.

An exemplary circuit for moving the cutoff frequency $f_{LPF}$ in a slow, deliberate manner in accordance with one exemplary aspect of the present invention is illustrated in FIG. 10 and designated at reference numeral 170. An RC time constant (T) is set by the components R and C in the circuit 170 to produce a time varying gate voltage at a transistor M1. As the gate voltage of M1 changes based on the time constant, the on-resistance associated with M1 varies between an approximate short circuit and an approximate open circuit, thereby varying an effective resistance 172 formed by the parallel combination of $R_{LPF}$ and $1/10R_{LPF}$. As M1 varies in resistance, the effective resistance 172 operates in conjunction with $C_{LPF}$ to form a low pass filter 174 having a cutoff frequency that varies at a rate dictated by the time constant T. Although the circuit 170 is provided in FIG. 10, other circuits may be employed to effectuate such functionality and such alternatives are contemplated as falling within the scope of the present invention.

Returning now to FIG. 7, once the time interval 130 is complete, the X-to-read parade sequence 106 concludes with a transition of the squelch signal 110 at the time instant 133. The transition of the squelch signal 112 indicates an initiation of the read mode 104 since a short circuit condition associated with the preamplifier output of the selected head is discontinued. Therefore in accordance with one aspect of the present invention, an X-to-read parade 106 comprises an identification of an end of a non-read state, a predetermined wait time interval, a pole shift interval in which the pole is shifted in a deliberate manner, and a transition of the squelch signal. The X-to-read parade 106 provides for an optimized and smooth transition to a read state from any non-read state, thus reducing circuit complexity and cost associated therewith.

Figure 11:
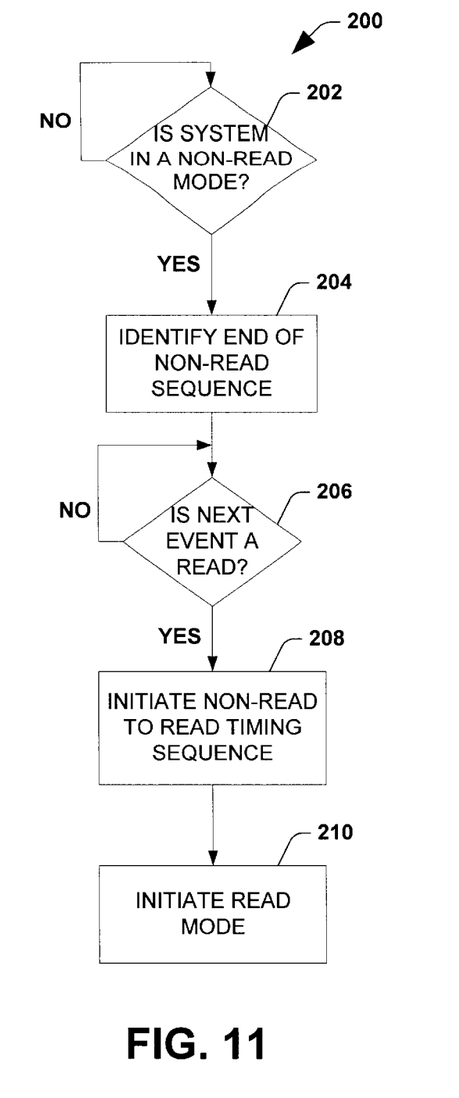
FIG. 11 is a flow chart diagram illustrating a method of transitioning between a non-read state and a read state in accordance with the present invention.

In accordance with another aspect of the present invention, a method of enhancing a preamplifier read recovery is disclosed in FIG. 11 and designated at reference numeral 200. While, for purposes of simplicity of explanation, the methodology of FIG. 11 is shown and described as a series of steps, it is to be understood and appreciated that the present invention is not limited to the order of steps, as some steps may, in accordance with the present invention, occur in different orders and/or concurrently with other steps from that shown and described herein. For example, a methodology in accordance with an aspect of the present invention may be represented as a combination of various states (e.g., in a state diagram). Moreover, not all illustrated steps may be required to implement a methodology in accordance with an aspect of the present invention.

Initially at step 202, a query is made whether the preamplifier is in the non-read mode. For example, the status of the squelch signal 110 may be evaluated. If the system is not in a non-read mode (NO), then the preamplifier is in the read mode and no parade sequencing is necessary. If, however, the system is in a non-read mode (YES), then the end of the unique non-read sequence is identified at step 204, for example, the end of an idle state or the end of a write operation.

Once the end of the non-read state has ended, another query is made at step 206 whether the next event is going to be a read. If not (NO), then the method 200 returns to step 204 to identify the end of the next non-read sequence. If the answer to the query of step 206 is in the affirmative, then the system is transitioning from a non-read to a read state and a non-read (X) to read timing sequence is initiated at step 208. Upon completion of the X-to-read sequence at step 208, the read mode is initiated at step 210.

Figure 12:
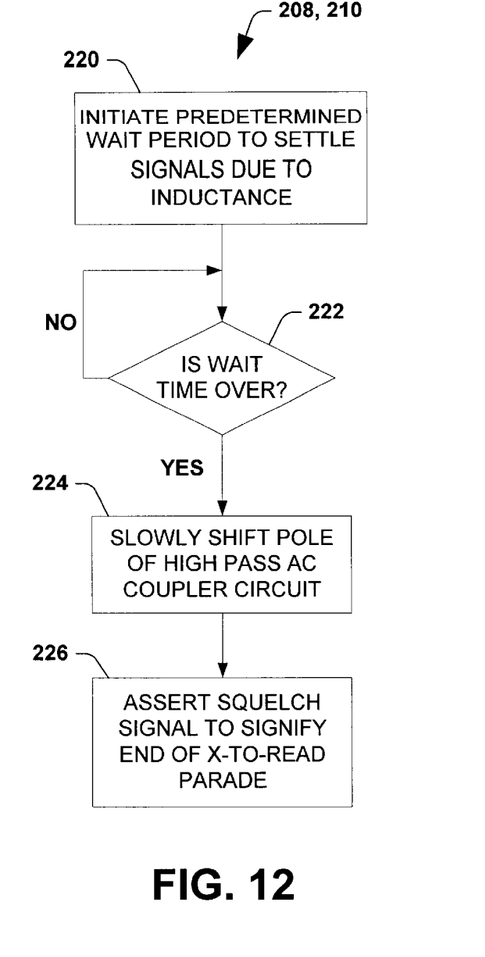
FIG. 12 is a flow chart diagram illustrating a method of executing a non-read to read timing sequence in accordance with the present invention.

Steps 208 and 210 are illustrated in greater detail in accordance with one exemplary aspect of the present invention in FIG. 12. At step 220 a predetermined wait period is initiated to settle voltage transients that may exist due to system inductance. The predetermined wait time may be varied as a function of the expected system inductance, wherein the wait time may be decreased as system inductance decreases. Furthermore, the entire X-to-read parade timing may be user-configurable or programmable, as may be desired, for example, in 100 nS increments (e.g., 100 nS, 200 nS, . . . ). At step 222, the method queries whether the predetermined wait period has lapsed.

Once the wait period is complete (YES at step 222), the pole associated with the AC coupler circuit is shifted from a first, higher frequency to a second, lower frequency in a relatively slow manner at step 224. For example, the pole may be shifted in such a manner that the lower cutoff frequency of the bandpass response of the AC coupler circuit shifts from about 10 MHz to about 1 MHz over a time period of at least 50 nS. The gradual shifting of the pole as opposed to the generally instantaneous shifting advantageously prevents noise from being sampled to the read channel.

Once the time period for the pole shifting is complete at step 224 the squelch signal 110 is de-asserted (e.g., going from high to low) to signify the end of the X-to-read parade and the initiation of the read mode at step 226. Please note that step 224 may be considered complete when a predetermined amount of shifting has occurred as opposed to requiring the pole fully reach and settle at the second, lower frequency, as may be desired.

Although the invention has been shown and described with respect to a certain preferred embodiment or embodiments, it is obvious that equivalent alterations and modifications will occur to others skilled in the art upon the reading and understanding of this specification and the annexed drawings. In particular regard to the various functions performed by the above described components (assemblies, devices, circuits, etc.), the terms (including a reference to a "means") used to describe such components are intended to correspond, unless otherwise indicated, to any component which performs the specified function of the described component (i.e., that is functionally equivalent), even though not structurally equivalent to the disclosed structure which performs the function in the herein illustrated exemplary embodiments of the invention. In addition, while a particular feature of the invention may have been disclosed with respect to only one of several embodiments, such feature may be combined with one or more other features of the other embodiments as may be desired and advantageous for any given or particular application. Furthermore, to the extent that the term "includes" is used in either the detailed description and the claims, such term is intended to be inclusive in a manner similar to the term "comprising."

What is claimed is:

1. A method of enhancing a preamplifier read recovery in a hard disk drive system, comprising the steps of:

determining whether the hard disk drive system is transitioning from a non-read state to a read state;

initiating a non-read state to a read state transition sequence when a transition from the non-read state to the read state is determined, wherein the transition sequence is independent of a type of non-read state prior to the transitioning; and initiating a read mode after the transition sequence, wherein initiating the non-read state to the read state transition sequence comprises altering a band pass response associated with an AC coupler circuit associated with an output of the preamplifier, and wherein altering the band pass response comprises lowering a lower cutoff frequency associated with the AC coupler circuit from a first frequency to a second frequency over a predetermined period of time.

2. The method of claim 1, wherein determining whether the hard disk drive system is transitioning from a non-read state to the read state comprises evaluating a status of one or more control signals.

3. The method of claim 1, wherein the non-read state comprises an idle state, a write state, a reader bias current change state, a head change state, a head change and a read bias current change state, or a reader bias off to on state.

4. The method of claim 1, wherein the transition sequence being independent of a type of non-read state prior to transitioning comprises employing the same transition sequence for all transitions from a non-read state to a read state.

5. The method of claim 1, wherein the first frequency is about 10 MHz, the second frequency is about 1 MHz and the predetermined period of time is about 50 nS.

6. The method of claim 1, further comprising the step of waiting a predetermined period of time prior to altering the band pass response, thereby allowing a settling of any transient voltages associated with the output of the preamplifier.

7. The method of claim 1, wherein initiating the read mode comprises removing a short circuit condition associated with an output of the preamplifier after the transition sequence.

8. A method of enhancing a preamplifier read recovery in a hard disk drive system, comprising the steps of:
- determining whether the hard disk drive system is transitioning from a non-read state to a read state;
- initiating a non-read state to a read state transition sequence when a transition from the non-read state to the read state is determined, wherein the transition sequence is independent of a type of non-read state prior to the transitioning; and
- initiating a read mode after the transition sequence,
- wherein initiating the non-read state to the read state transition sequence comprises altering a band pass response associated with an AC coupler circuit associated with an output of the preamplifier,
- wherein altering the band pass response comprises lowering a lower cutoff frequency associated with the AC coupler circuit from a first frequency to a second frequency over a predetermined period of time, and
- wherein altering the band pass response comprises shifting a pole associated with the AC coupler circuit at a predetermined rate so as to decrease a lower cutoff frequency associated therewith.

9. A method of transitioning from a plurality of differing types of non-read states to a read state in a hard disk drive system, comprising the steps of:
- executing a sequence of events associated with a non-read state;
- initiating a series of events which transitions the non-read state to a read state, wherein the series of events is the same for differing sequences of events associated with differing types of non-read states, thereby providing a common transition sequence for transitions between a non-read state and the read state; and
- initiating a read mode after the series of events;
- wherein initiating the series of events comprises:
  - initiating a predetermined wait time period; and
  - altering a band pass response of an AC coupler circuit associated with a preamplifier of the hard disk drive system by lowering a lower cutoff frequency of the AC coupler circuit at a predetermined rate, thereby resulting in a band pass response which rejects a larger range of lower frequencies in a non-read state than in the read state,
- wherein altering the band pass response comprises shifting a pole associated with the AC coupler circuit at a predetermined rate, wherein the rate is sufficiently slow to substantially prevent a sampling of noise onto an output of the preamplifier.

10. The method of claim 9, wherein the non-read state comprises an idle state, a write state, a reader bias current change state, a head change state, a head change and a read bias current change state, or a reader bias off to on state.

11. The method of claim 9, wherein the series of events comprises a user-configurable time period having two subintervals, wherein a first subinterval comprises a predetermined wait period and a second subinterval comprises a band pass response modification period, wherein a cutoff frequency associated with the hard disk drive system is varied.

12. The method of claim 9, wherein altering the band pass response of the AC coupler circuit comprises:
- coupling the output of the preamplifier to a delay circuit and a low pass filter circuit having a programmable cutoff frequency; and
- subtracting an output of the low pass filter circuit from an output of the delay circuit.

13. The method of claim 12, further comprising the step of varying the programmable cutoff frequency from a first frequency to a second frequency which is less than the first frequency over a predetermined period of time.

14. The method of claim 13, wherein the first frequency is about 10 MHz, the second frequency is about 1 MHz and wherein the predetermined period of time is at least 50 nS.

* * * * *